United States Patent
Hamilton (10) Patent No.: US 12,535,696 B2
(45) Date of Patent: Jan. 27, 2026

(54) NIGHT DRIVING EYEGLASSES AND METHODS OF USE

(71) Applicant: Kenneth Hamilton, Valley Springs, CA (US)

(72) Inventor: Kenneth Hamilton, Valley Springs, CA (US)

(*) Notice: Subject to any disclaimer, the term of this patent is extended or adjusted under 35 U.S.C. 154(b) by 332 days.

(21) Appl. No.: 18/217,448

(22) Filed: Jun. 30, 2023

(65) Prior Publication Data

US 2025/0004305 A1   Jan. 2, 2025

(51) Int. Cl.
*G02C 7/10*   (2006.01)

(52) U.S. Cl.
CPC .................... *G02C 7/104* (2013.01)

(58) Field of Classification Search
CPC ........... G02C 7/104; G02C 7/105; G02C 7/16
See application file for complete search history.

(56) References Cited

U.S. PATENT DOCUMENTS

| | | |
|---|---|---|
| 2,358,602 A | 9/1944 | Snyder |
| D208,502 S | 9/1967 | Halpern et al. |
| 3,512,880 A | 5/1970 | Alexander et al. |
| 4,168,111 A | 9/1979 | Baines |
| 4,824,233 A | 4/1989 | Jannard |
| 5,428,409 A | 6/1995 | Silverstein |
| 5,488,438 A | 1/1996 | Cochran |
| 5,682,220 A | 10/1997 | Sherman et al. |
| 5,710,613 A | 1/1998 | Hughes |
| 6,575,569 B1 | 6/2003 | Castellano |
| 6,623,116 B2 | 9/2003 | Kerns, Jr. et al. |
| 7,306,331 B1 | 12/2007 | Tigert |
| 8,277,045 B2 | 10/2012 | Hobbs |
| 8,911,082 B2 | 12/2014 | Ambler |
| 11,036,064 B1 | 6/2021 | Petrillo, Sr. |
| 2004/0046927 A1 | 3/2004 | Montgomery |
| 2006/0285073 A1 | 12/2006 | Yeh |
| 2007/0008485 A1 | 1/2007 | Baiocchi et al. |
| 2007/0132943 A1 | 6/2007 | Kurzrok |
| 2021/0109370 A1 | 4/2021 | Jackson |

FOREIGN PATENT DOCUMENTS

| | | |
|---|---|---|
| WO | 2005047961 A1 | 5/2005 |
| WO | 2019077585 A1 | 4/2019 |

OTHER PUBLICATIONS

International Search Report and Written Opinion from co-pending application PCT/US2024/035349, Forms PCT/ISA/220, PCT/ISA/210, PCT/ISA/237 (Dec. 3, 2024).

*Primary Examiner* — Tuyen Tra (74) *Attorney, Agent, or Firm* — Sierra IP Law, PC; Mark D. Miller (57) ABSTRACT

Disclosed are methods and apparatus that use specially tinted eyeglasses that may be used to block or diffuse light from the headlights of oncoming traffic or trailing traffic reflected in side mirrors, while also allowing the wearer to see dark areas outside and inside the vehicle. Lenses are provided that have shading on the left and/or right sides of each lens leaving a large unshaded or clear vertical area in the middle of each lens, running from the top of each lens to the bottom. In use, when a driver or passenger wearing the eyeglasses while traveling at night or in the dark encounters bright light from oncoming traffic, or bright light reflected in side mirrors, they may turn their head slightly to the left or to the right in order to use the left and/or right shaded areas of the lenses to reduce or block the light, and are still able to see dark areas outside and inside the vehicle through the unshaded central area.

32 Claims, 11 Drawing Sheets

NIGHT DRIVING EYEGLASSES AND METHODS OF USE

FIELD OF THE INVENTION

The present invention relates generally to shaded eyeglasses, and more particularly to eyeglasses for use in driving at night or in the dark having specially positioned shaded areas that may be used to block or diffuse light from the headlights of oncoming traffic and/or from the headlights of rear traffic reflected in side view mirrors, and related methods of use.

BACKGROUND OF THE INVENTION

Tinted eyeglasses have been widely used for many purposes, from visual comfort and glare reduction to the mitigation of eye-related issues, such as photophobia, and enhancing visual performance in various light conditions. Sunglasses are the most common use for tinted eyeglasses which are designed to reduce the amount of glare and/or sunlight reaching the eye. Specially tinted eyeglasses are also used to improve performance, for example, in darkrooms where tinting assists in film development, in ski goggles where tinting assists in glare reduction, and in various laboratory situations where different colored tinting may allow observation of different colors found in different materials or experiments.

One of the well-known dangers of driving after dark is the potential for brief blindness caused by the headlights of oncoming traffic or from headlights. Such blinding can occur on 2-lane roads when a driver of an oncoming vehicle fails to turn off their bright lights, when lights on an oncoming vehicle have a high placement (such as on a large semi-truck), when climbing a hill facing oncoming downhill traffic, when barriers between lanes are not tall enough to block the lights of oncoming traffic, and various other conditions. Similarly, bright headlights from rear traffic may be reflected in side-view mirrors when the rear traffic fails to turn down bright lights, has high light placement, and the like. For rear traffic, while the rearview mirror may ordinarily be adjusted to deflect bright light from trailing vehicles, this is not always possible or appropriate for side view mirrors.

The human eye adjusts to the low light levels inside a vehicle while driving at night or in the dark, which increases the negative effect of sudden bursts of bright light. When a driver is suddenly confronted by bright oncoming or trailing lights, it is unsafe for the driver to close their eyes or to look away, since this runs the risk of driving out of control, steering into another lane, hitting another vehicle/person/object/animal in the road, or driving off the road entirely. Using sunglasses or other tinted lenses at night or in the dark does not provide a satisfactory solution since, although the tinted lenses will filter some light, the tinted lenses will also reduce the ability of the driver to see dark areas outside of the vehicle or inside the vehicle such as the dashboard, resulting in an unsafe condition.

There is therefore a need to provide methods and apparatus to assist in driving at night or in the dark that allow a driver to block or diffuse light from the headlights of oncoming or trailing traffic while also allowing the driver to see outside and inside the vehicle unobstructed by tint.

SUMMARY OF THE INVENTION

The present invention provides methods and apparatus that use specially tinted eyeglasses for blocking light from the headlights of oncoming or trailing traffic while also allowing the driver to see dark areas outside and inside the vehicle. Embodiments of the eyeglasses of the present invention include lenses that have shading on the left and/or right sides of the lens for each eye leaving an unshaded or clear vertical section in the middle of each lens. When a driver of a vehicle who is wearing eyeglasses of an embodiment of the present invention at night or in the dark encounters bright light from oncoming traffic, the driver may turn their head slightly to the left or to the right in order to use the left and/or right shaded areas of the lenses to reduce or block the oncoming light, while still being able to see other dark areas both outside and inside the vehicle through the unshaded central areas. Similarly, if the driver encounters bright light in the side mirrors from rear traffic, the driver may turn their head slightly to the left or to the right in order to use the left and/or right shaded areas of the lenses to reduce or block the light from the side mirrors. Because the clear, unshaded central area runs from the top of each lens to the bottom, a wearer may see dark areas outside of the vehicle, may look down to see the dashboard, may look up to see the rearview mirror, and may view other dark exterior or interior areas of the vehicle.

It is to be appreciated that eyeglasses of each of the embodiments of the present invention may be used not only by drivers but also by passengers of vehicles traveling at night or in the dark. It is also to be appreciated that embodiments of the present invention are not limited to dual-lens eyeglasses, but that in different embodiments, shading for the left and right eyes of the wearer may be provided at appropriate locations on a single lens such as those used with ski goggles, helmets such as motorcycle helmets, fashionable eyeglasses, one-piece eyeglasses and the like. It is to be understood that in the descriptions below, when references are made to left and right lenses, for these single-lens embodiments, those references refer to the areas on the single lens in front of the left and right eyes of the wearer.

The left and right shaded areas may be of various widths. The left and right shaded areas for each eye may have the same width or different widths. The left and right shaded areas for one eye may have the same widths as the other eye, or may have different widths than the other eye. In some embodiments, the width of the shaded areas may be governed by the width of the open area since the lens size will vary depending on the frames being used. The center of the non-tinted area should align with the center of the eye. In some embodiments, the central clear area may be about 1.25 inches or about 48 mm wide. In some embodiments, the shaded areas next to the nose may be about ¼ inch wide or about 5 to 6 mm. In many embodiments, the shaded areas next to the nose are a constant width, while those at the outsides are of different widths. In some embodiments, the outer shaded areas may be about ½ inch or about 13 mm to fill out the lens. In many embodiments, the inner tinted area (next to the nose) width will remain constant across many different lens and frame types, as will the central clear area. It is to be appreciated that in single-lens embodiments, the eyeglasses will wrap around the head, and will provide side tint for the side-view mirrors, and that width may vary depending on how much of the lens wraps around the head.

In different embodiments, the patterns for the left and right shaded areas may be the same for both eyes, or different for each eye. The left and right shaded areas may also be of various colors. The shaded areas may be of the same color for each eye, or for both eyes; or they may be of different colors for one eye than the other eye; or they may have different colors for the same eye (i.e., the left and right shaded areas for an eye may be of different colors); and/or different colors may be mixed or blended together. Some potential colors for tinting include without limitation shades of red, green, blue, yellow, and black/grey depending on the sensitivity of the driver, it being appreciated that tinting is not limited to these colors and that different embodiments may use any other suitable colors for tinting.

In those countries where vehicles drive on the right side of the road (such as in the USA), oncoming traffic will be on the left, so the driver wearing glasses of an embodiment of the present invention would turn their head slightly to the right to place the shaded areas of the lenses between the oncoming light and the eyes of the driver. In other countries where vehicles drive on the left side of the road (such as in the UK), oncoming traffic will be on the right, so the driver would turn their head slightly to the left to use the shaded areas of the lenses to block or diffuse the oncoming light.

In some embodiments, the shaded lenses of embodiments the present invention may be provided on one or more removable lenses that may be placed over or clipped onto a driver's existing eyeglasses. For example and without limitation, lenses of an embodiment of the present invention may be provided in a frame that is clipped onto the prescription eyeglasses of a driver, and may be flipped down when in use, and flipped up when not in use.

In some embodiments, there may be no transition between the shaded areas at the edges of the lenses and the clear area in the middle, with the areas either being fully shaded or unshaded, with a hard dividing line between them. These embodiments make it easy to place the lights of oncoming traffic completely behind the shaded areas of the lenses by sufficiently turning the driver's head. In other embodiments, there may be a gradual transition from the unshaded to shaded areas of the lenses. These embodiments allow the driver to compensate for different levels of brightness of the oncoming traffic, such that the driver's head need not be turned as far in order to move less bright lights behind a less shaded area of the lenses, and/or to turn further in order to move more shading in front of brighter oncoming light.

In some embodiments, the shaded areas themselves may have different levels of shading. For example and without limitation, darker shading may be provided in the middle of the shaded area, with lighter shading at the top of the shaded area, at the bottom of the shaded area, or both.

In some embodiments, different patterns for the shaded and clear areas may be provided. For example and without limitation, the central clear area may have the shape of a modified hourglass, providing more of the clear area near the top and bottom to allow the driver to look down at the dashboard and up at the rear mirror, but also providing wide central shaded areas that allow only a slight turn of the driver's head to the left or right to move the shaded areas of the lenses in front on oncoming headlights. It is to be appreciated that other patterns may be adopted for the clear and shaded areas of the lenses of eyeglasses of the present invention, including without limitation horizontal line separations, straight line separations, curved line separations, angled separations (e.g., triangular shaded areas), convex shaded areas, concave shaded areas, and other patterns. For example and without limitation, embodiments may provide triangularly shaped left and right-shaded areas that point toward the center of the lens so as to provide more available shading in the center than at the top or bottom. Such embodiments may be highly effective since the side/middle of the lens is the most convenient place for the wearer to place bright oncoming headlights in order to dim them.

In some embodiments, shaded areas may be provided on the outside edges of the lenses only, with no shading on the inside edges. In these embodiments, the outside shading may be used to block or diffuse oncoming light coming to the driver's eye nearest the traffic, and allowing the driver's nose to block the oncoming light coming to the driver's other eye. These embodiments allow the driver to emphasize the use of one eye for dealing with oncoming traffic, and the use of the other eye for watching the road and/or seeing dark areas outside and inside the vehicle.

In some embodiments, the shaded areas may be provided in the form of film or stickers that may be temporarily applied to existing eyeglass lenses and peeled off when not in use. These embodiments allow a driver to temporarily transform a pair of ordinary prescription eyeglasses into night or darkness driving eyeglasses without having to attach or clip on additional lenses. These embodiments also allow a driver to select or adjust the amount and placement of left and/or right shading as desired. These embodiments also allow a user to choose the color(s) for the shaded areas, enabling the user to select the color(s) that work best and are most suited or advantageous for that particular user. These embodiments also allow a user to choose the pattern(s) for placement of the shaded areas on the eyeglasses, depending on the preferences of the user. It is to be appreciated that in some embodiments, multiple stickers of different colors may be used, for example, to provide a transition of colors from the clear central area to very dark shaded edge areas. It is to be appreciated that in some embodiments, such film or stickers may be permanently adhered to the user's eyeglass lenses, if desired.

In different embodiments, different colors of shading may be provided. In some embodiments, the shading may be red for the preservation of night vision by reducing the effect of bright direct and peripheral light generated by oncoming traffic headlights and headlights behind the driver's car reflecting off of the driver's side mirrors. In some embodiments, the red tint color may be in the spectrum of approximately 610-750 nanometers (nm). Since human eyes use cones to see bright lights and rods to see in the dark, the color red is only picked up by the cones. The eye's rods are unaffected by the red light, preventing the wearer's eyes from being as affected by bright lights. Red is therefore a suitable color tint for situations where the wearer will encounter deep darkness and bright lights together, and the optimal tint level will vary depending on the wearer's situation. For example and without limitation, a tint level in the range of about 610 nm to about 640 nm would be appropriate for low/moderate light level situations—such as a trucker sitting up above traffic who does not encounter a lot of high beams from oncoming traffic. A driver in a lower car, such as a sedan, commuting during dark hours around heavy traffic may be better served by lenses with a tint in the range of about 640 nm to about 700 nm.

In some embodiments, the shading may be green, and may have wavelengths of between about 500 nm to about 570 nm. This shading may be advantageous when the user encounters moderate darkness and moderately bright lights. This is due to the eye being able to differentiate more shades of green than any other color, which allows for increased contrast and clarity. In some embodiments, the shading may be blue, and may have a wavelength of between about 450 and about 495 nm. This shading may be advantageous to help the eyes see contours and/or to perceive color, so a blue tint may help a wearer enhance vision while engaging in activities where higher brightness would otherwise hurt the eye's natural ability to discern, such as while in the snow or at a body of water.

In some embodiments, the shading may have a dark tint such as black or grey, for situations where very bright light may be encountered, such as the tint that is typically used on vehicle windows. In other embodiments, the shading may have a yellow tint that may help reduce the effect of blue-colored headlights, blue light emanating from electronic screens, and in generally low-light situations.

In one aspect, eyeglasses of the present invention may comprise a frame supporting a pair of lenses in front of a user's left and right eyes in which each of the lenses comprises a central unshaded area in front of an eye that extends from a top edge of the lens to a bottom edge of the lens, a first shaded area on a left side of the central area that extends from the central area to a left edge of the lens, and a second shaded area on a right side of the central area that extends from the central area to a right edge of the lens. In related aspects, the central unshaded area transitions to the left and right shaded areas along straight vertical lines, or the central unshaded area gradually transitions from clear to shaded along the left and right sides. In some aspects, the shaded areas have a red tint, which may have a wavelength of between about 610 nm and about 750 nm. In some aspects, the shaded areas have tints of different colors, which may be red, green, blue, yellow or grey/black, or any combination thereof. In some aspects, the central unshaded area has an hourglass shape, or the first and second shaded areas may be in the form of triangles having points that protrude toward each other into the central area. In some aspects, the central unshaded area, the first shaded area, and the second shaded area have the same width, but in other aspects, the central unshaded area may have a width that is twice as wide as either the first or second shaded area.

In another aspect, eyeglasses of the present invention may comprise a frame supporting a single lens that extends in front of a user's left and right eyes wherein areas of the lens comprise an unshaded area in front of each eye that extends from a top edge of the lens to a bottom edge of the lens, a first shaded area on a left side of each unshaded area that extends from the unshaded area to a left edge of the lens, and a second shaded area on a right side of each unshaded area that extends from the unshaded area to a right edge of the lens.

In another aspect, eyeglasses of the present invention may comprise a frame supporting a pair of unshaded lenses in front of a user's left and right eyes wherein a first pair of shaded film strips are adhered to the left side of each of the lenses, and a second pair of shaded film strips are adhered to a right side of each of the lenses leaving an unshaded central area in front of each eye that extends from a top edge of each lens to a bottom edge of each lens. In related aspects, the shaded film strips may be removable or permanent. In some aspects, the shaded film strips may have a red tint that may have a wavelength of between about 610 nm and about 750 nm, or they may have a tint that is green, blue, yellow or grey/black, or any combination thereof. In some aspects the unshaded area may have an hourglass shape, or the first and second film strips may be in the form of triangles having points that protrude toward each other into the unshaded area.

In another aspect, eyeglasses of the present invention may comprise a frame supporting left and right lenses in front of a user's left and right eyes wherein each of the lenses comprises a central unshaded area in front of the eye that extends from a top edge of the lens to a bottom edge of the lens, a first shaded area on an outside edge of the left lens and a second shaded area on an outside edge of the right lens.

In another aspect, a method of avoiding light from oncoming traffic while driving at night or in the dark may comprise the steps of: (1) a user putting on eyeglasses comprising a frame supporting left and right lenses wherein each of the lenses comprises a central unshaded area that extends from a top edge of the lens to a bottom edge of the lens, a first shaded area on a left side of the central area that extends from the central area to a left edge of the lens, and a second shaded area on a right side of the central area that extends from the central area to a right edge of the lens; (2) the user traveling in a vehicle when it is dark outdoors; and (3) the user turning their head to the right or to the left in response to light from oncoming traffic or light from a side mirror until a shaded area of at least one of the lenses comes between the light and an eye of the user. In related aspects, the user may turn their head to the right such that light from oncoming traffic reaching the user's left eye is diffused by the left shaded area of the left lens, and light from oncoming traffic reaching the user's right eye is diffused by the left shaded area of the right lens. In other related aspects, the user may turn their head to the left such that light from oncoming traffic reaching the user's right eye is diffused by the right shaded area of the left lens, and light from oncoming traffic reaching the user's left eye is diffused by the right shaded area of the left lens. In another aspect, light from oncoming traffic reaching the user's left eye is diffused by the left shaded area of the left lens, and light from oncoming traffic reaching the user's right eye is blocked by the user's nose.

Further aspects and embodiments will be apparent to those having skill in the art from the description and disclosure provided herein.

It is an object of the present invention to provide methods and apparatus for use in driving at night or in the dark driving to shield the eyes of a driver or passenger from the bright lights of oncoming traffic or from bright lights in side mirrors.

It is an object of the present invention to provide eyeglasses having lenses with a central clear area and left and right shaded areas for use in driving at night or in the dark to shield the eyes of a driver or passenger from the bright lights on oncoming traffic or from bright lights in side mirrors.

It is an object of the present invention to provide detachable add-on frames with lenses therein having a central clear area and left and right shaded areas for temporary attachment to existing eyeglasses for use in driving at night or in the dark to shield the eyes of a driver or passenger from the bright lights of oncoming traffic or from bright lights in side mirrors.

It is an object of the present invention to provide (removable) film or stickers that may be adhered to lenses of existing eyeglasses to define a central clear area and left and right shaded areas for use in driving at night or in the dark to shield the eyes of a driver or passenger from the bright lights on oncoming traffic or from bright lights in side mirrors.

It is an object of the present invention to provide methods for using eyeglasses having a central clear area and left and right shaded areas for driving at night or in the dark to shield the eyes of a driver or passenger from the bright lights on oncoming traffic or from bright lights in side mirrors when driving at night or in the dark.

Other objects of the invention will be apparent from the detailed descriptions and the claims herein.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided. For example and without limitation, although embodiments of the invention are described herein with reference to driving vehicles on roadways, embodiments of the invention may also be used while boating, fishing, hiking, walking, on the beach, in astronomy, in night safety work, for dark indoor activities, for low light sports, for viewing television, at live concerts, and other situations where selective shielding of bright light may be desired.

Referring first to the exemplary embodiment shown in FIGS. 1-7, it is seen that in this embodiment, a frame member 10 is provided for supporting a right lens 12 and a left lens 16. Frame 10 is pivotally attached to temples 21, and 22 which fit over the ears of a wearer. In this embodiment, each lens 12 and 16 includes a central clear or unshaded area, as well as left and right shaded areas. In particular, in the illustrated embodiment of FIGS. 1-7, right lens 12 includes a clear central area 13, a right-shaded area 14, and a left-shaded area 15. Similarly, left lens 16 includes a clear central area 17, a right-shaded area 18, and a left-shaded area 19.

In the illustrated embodiment, the clear central areas 13, 17 of each lens 12, 16 extend from the bottom of each lens to the top of each lens. Similarly, the shaded areas 14, 15 and 18, 19 also extend from the bottom of each lens to the top. This allows the shaded areas to be easily placed between the bright headlights of oncoming traffic by moving the head of the wearer slightly to the left or to the right, while also allowing the wearer to be able to see things in the dark cabin of the vehicle, such as the dashboard or rearview mirror, through the unshaded central area.

Figure 17:
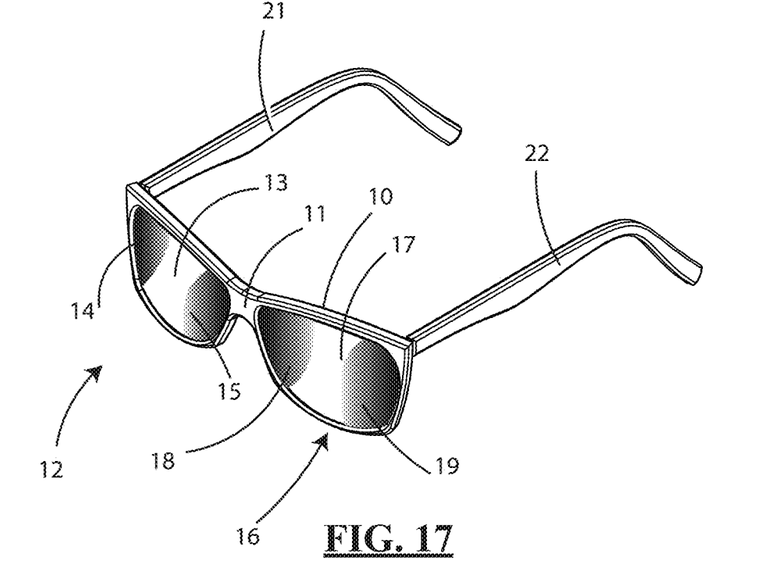
FIG. 17 is a perspective view of an alternative embodiment of the present invention.
Figure 18:
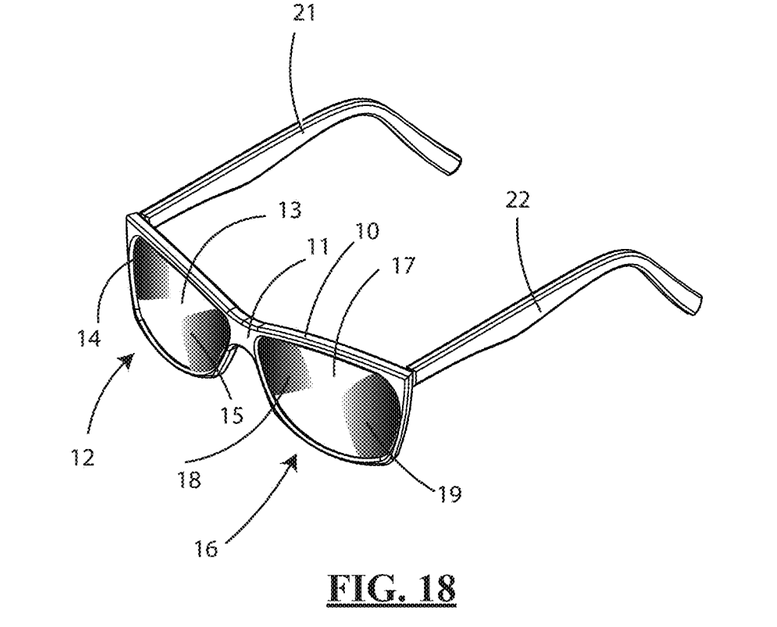
FIG. 18 is a perspective view of an alternative embodiment of the present invention.

In the illustrated embodiment of FIGS. 1-7, it is seen that there is a gradual transition from the central clear area to the shaded areas to the right and left. It is to be appreciated that in other embodiments, this transition may be a straight line separating the completely unshaded central area from the completely shaded side areas. In the illustrated embodiment, the transition is generally vertical. However, it is to be appreciated that in other embodiments different patterns may be used for the shaded and unshaded areas of the lenses. For example, and without limitation, the unshaded central area may have an hourglass shape, with inward bulges from the left and right shaded areas as shown in FIG. 17; or the shaded areas may have a triangular shape pointing toward the center as shown in FIG. 18.

In the illustrated embodiment of FIGS. 1-7, it is seen that the unshaded central area is about twice as large as the shaded areas, and takes up about half of the surface area of each lens, with the left and right shaded areas taking up about one quarter of the surface area of each lens. However, in other embodiments, the area of the lens taken up by the shaded and unshaded areas may be different. In some embodiments, each area (right, central, and left) may be of about the same size. In some embodiments, the central area may be much wider than the side areas; in other embodiments the side areas may be much wider than the central area; and in other embodiments, each area may (right, central, and left) may have a different size.

It is to be appreciated that there may be differences between the two lenses 12, 16 of each embodiment. In some embodiments the sizes of the areas (right, central, and left) on the right lens 12 may be different from the sizes of those areas on the left lens 16. For example and without limitation, in countries where vehicles travel on the right side of the road, the left shaded area 19 of the left lens 16 may be wider than the right shaded area 18 of the left lens 16 to make it easier to move the shaded area 19 in front of oncoming traffic on the left side of the vehicle. However, in countries where vehicles travel on the left side of the road, the right shaded area 14 of the right lens 12 may be wider than the left-shaded area 15 of the right lens 12 to make it easier to move the shaded area 14 in front of oncoming traffic on the right side of the vehicle.

In some embodiments, such as those shown in FIGS. 8-12, the eyeglasses have a single lens that covers both eyes, and the shaded areas may be provided in front of the left and right eyes on the single lens. It is to be appreciated that with respect to these embodiments, the "lenses" described above refer to the areas in front of the left and right eyes of the wearer. In these embodiments, the area over the bridge of the nose should be shaded so as to provide side shading to both the right and left eye of the wearer.

Referring to the embodiments shown in FIGS. 8-12, the eyeglasses may be provided in a single piece 35 that extends over both eyes of the user. These embodiments may include a shaded bridge 11 in the center of the piece 35 for nose support, and the bridge separating left 16 and right 12 lens areas for the left and right eyes of the user. As with other embodiments, central unshaded areas 13, 17 are provided for each eye, and shaded areas are provided on either side of the central unshaded areas. For the right lens 12, an inside shaded area 15 is provided between the central unshaded area 13 and the bridge 11; and an outside shaded area 14 is provided between the central unshaded area 13 and the right edge of the piece 35. For the left lens 16, an inside shaded area 18 is provided between the unshaded central area 17 and the bridge 11; and an outside shaded area 19 is provided between the central unshaded area 17 and the left edge of the piece 35.

As with other embodiments, the shaded areas of embodiments such as those shown in FIG. 8-12 may be separated from the unshaded area by clearly defined lines, or there may be a gradual transition from unshaded to shaded areas. Similarly, the shaded areas in embodiments such as those shown in FIG. 8-12 may be provided in a variety of different shapes, including without limitation, horizontal line separations, straight line separations, curved line separations, angled separations (e.g., triangular shaded areas), hourglass shaped central areas, convex shaded areas, concave shaded areas, and other patterns. The width of the shaded areas in embodiments such as those shown in FIG. 8-12 may also be the same as the central unshaded areas, or of different widths, or different combinations of widths. The shaded areas of embodiments such as those shown in FIG. 8-12 may also be graduated from top to bottom, with more shading in the middle and less at the tops and bottoms. The colors of the shaded areas of embodiments such as those shown in FIG. 8-12 may also be red, blue, green, yellow, grey/black, or combinations thereof, as with other embodiments. The shaded areas of embodiments such as those shown in FIG. 8-12 may also be provided using stickers, which may be permanent or removable. The shaded areas in embodiments such as those shown in FIG. 8-12 may be provided on clip-on lenses that clip onto or fit over piece 35.

Figure 15:
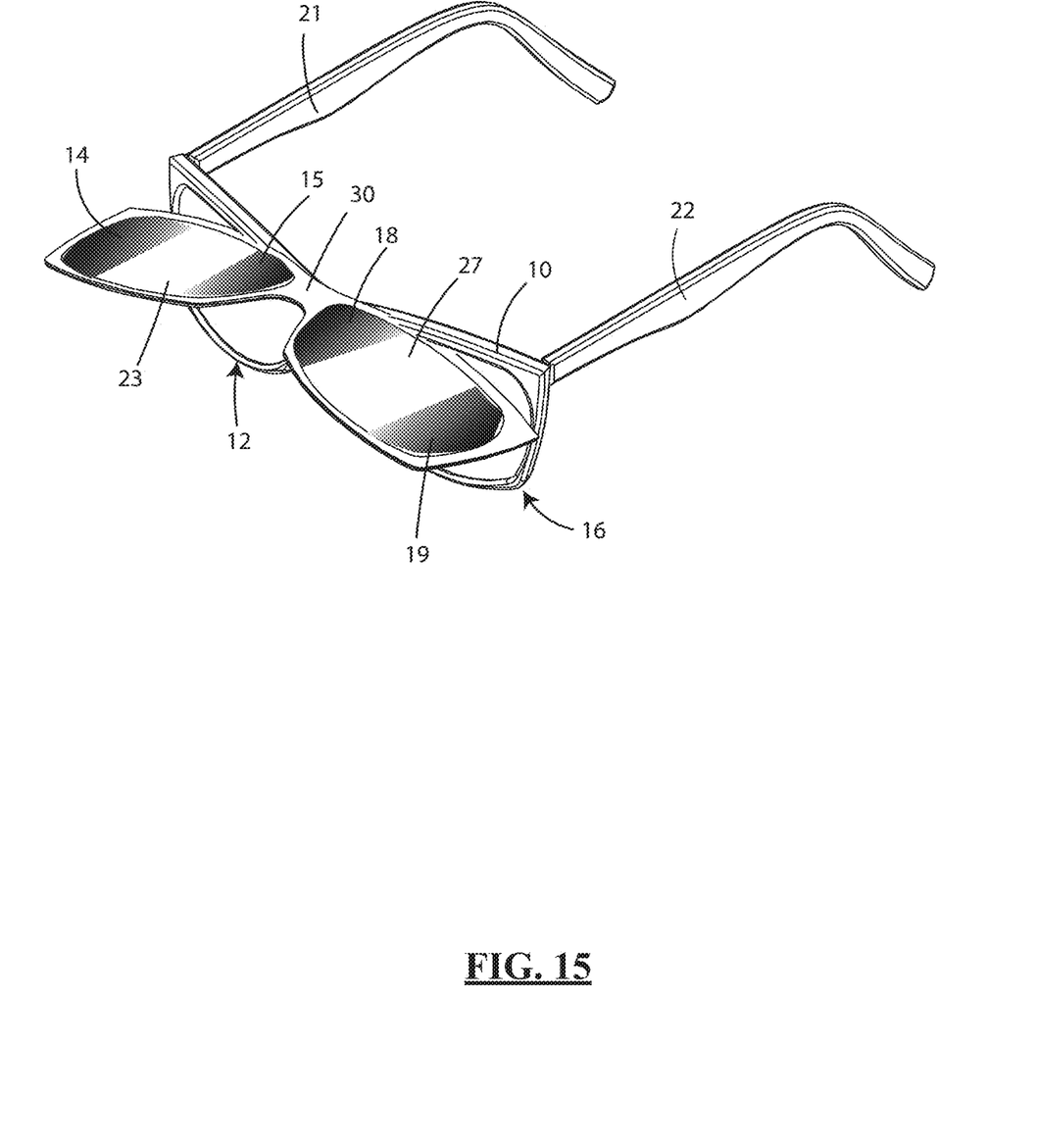
FIG. 15 is a perspective view of an alternative embodiment of the present invention.

In some embodiments, such as that shown in FIG. 15, the shaded lenses may be provided on lenses mounted in a separate frame 30 that may be placed over or clipped onto existing eyeglasses. For example and without limitation, lenses 23 and 27 of an embodiment of the present invention may be provided in a frame 30 that is clipped onto the prescription eyeglasses of a driver, and may be flipped down when in use, and flipped up when not in use as shown in FIG. 15. It is to be appreciated that the shaded areas on the lenses of a separate frame such as 30 may be provided in the form of stickers, and that they may be of various sizes, shapes, and colors as described herein with respect to other embodiments.

Figure 16:
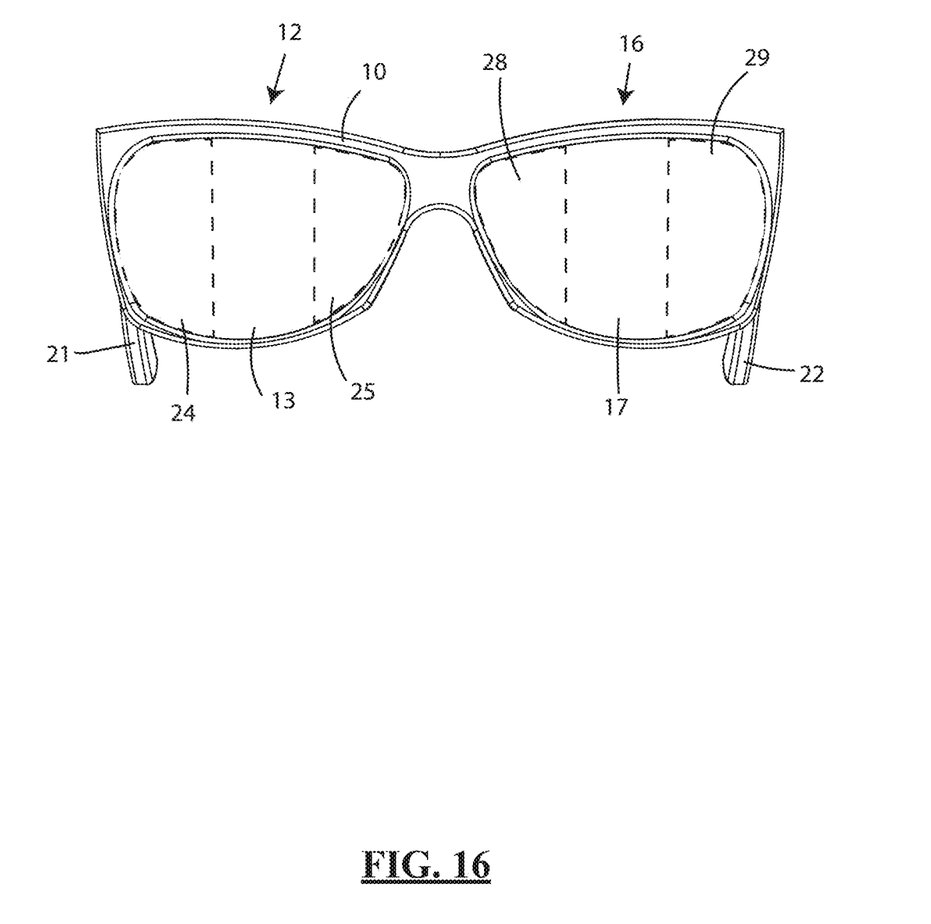
FIG. 16 is a perspective view of an alternative embodiment of the present invention.

In some embodiments, such as those shown in FIG. 16, the shaded areas may be provided in the form of film or stickers which are depicted in broken lines in FIG. 16. In the illustrated embodiment, left 25 and right 24 stickers may be applied to right lens 12, leaving a central unshaded area 13; and left 29 and right 28 stickers may be applied to left lens 16, leaving a central unshaded area 17. These stickers may be temporarily applied to existing eyeglass lenses and peeled off when not in use; or they may be permanently attached. This is particularly helpful for drivers having prescription eyeglasses that must be worn while driving, allowing a user to temporarily transform their prescription eyeglasses into eyeglasses useful for driving at night or in the dark. The size, shape, color, gradient, and placement of the film or stickers may be selected by the user, and then adhered or applied to the existing eyeglass lenses. It is to be appreciated that this provides a wide degree of latitude for a user to tailor the shaded areas to their particular needs and desires. It is to be appreciated that in some embodiments, such film or stickers may be permanently adhered to the user's eyeglass lenses, if desired.

The shaded areas of different embodiments may be provided in different colors for different effects. In some embodiments, the shaded areas 14, 15 and 18, 19 may all be of the same color. For example and without limitation, all of the shaded areas may be tinted red. In variations of this example, the wavelength of the red areas may be between about 620 nm and about 650 nm for an optimal effect in dark driving. In other embodiments, only some of the shaded areas may be of the same color, while other shaded areas may be of a different color.

In some embodiments, eyeglasses of the present invention may be provided in single-use versions that are inexpensive to make and that may be disposed of after use. In some embodiments, left and/or right-side shades may be provided to prevent peripheral lights from reaching the wearer's eyes.

Figure 1:
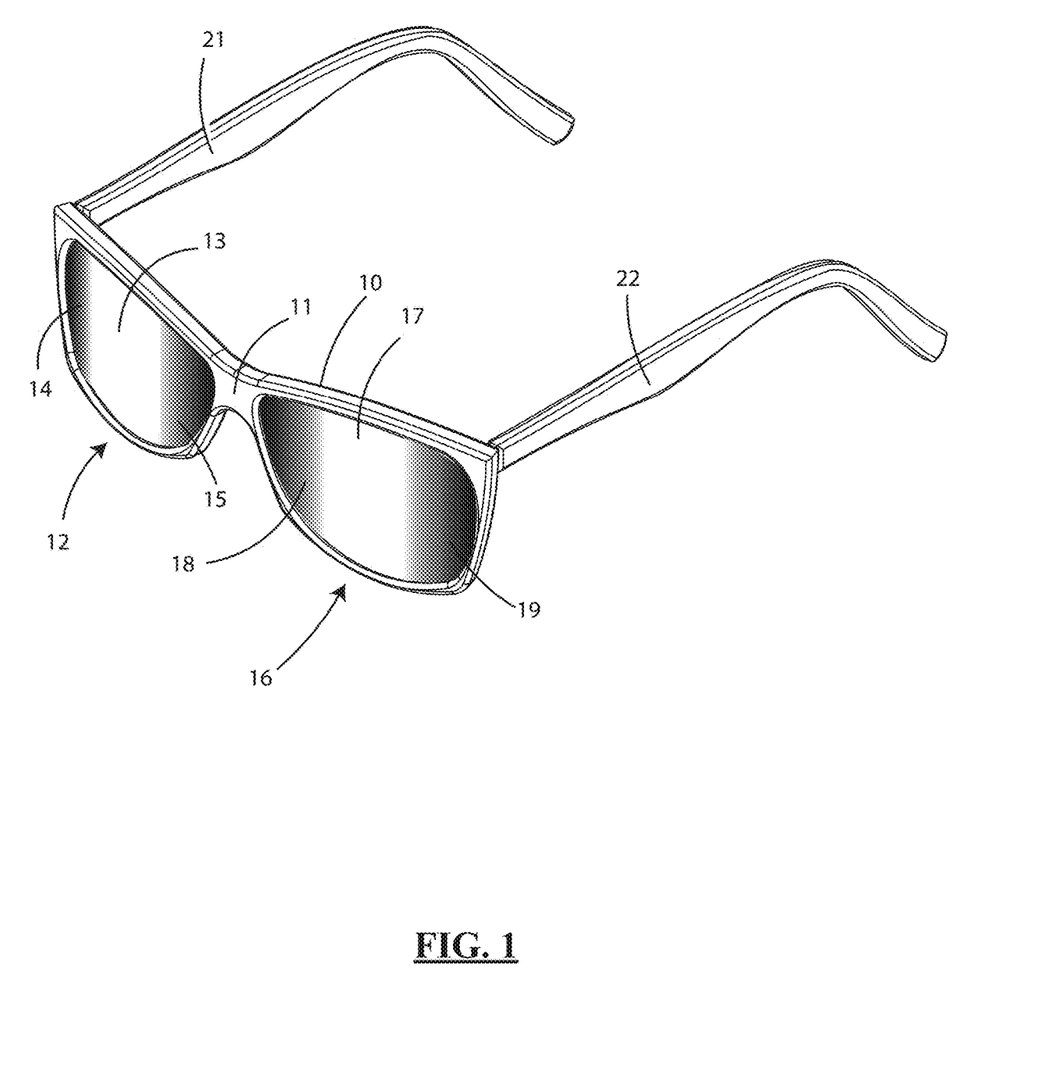
FIG. 1 is a perspective view of eyeglasses of an embodiment of the present invention.
Figure 2:
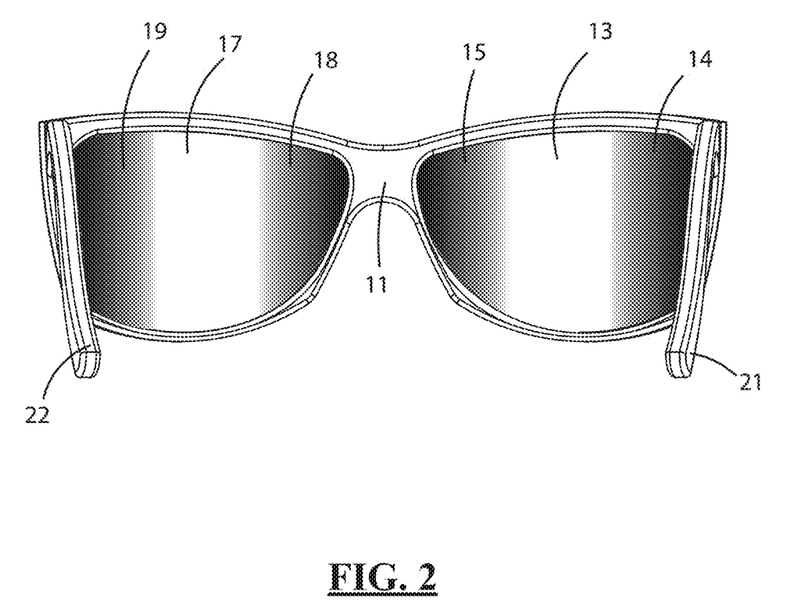
FIG. 2 is an interior back view of the eyeglasses of the embodiment of FIG. 1.
Figure 3:
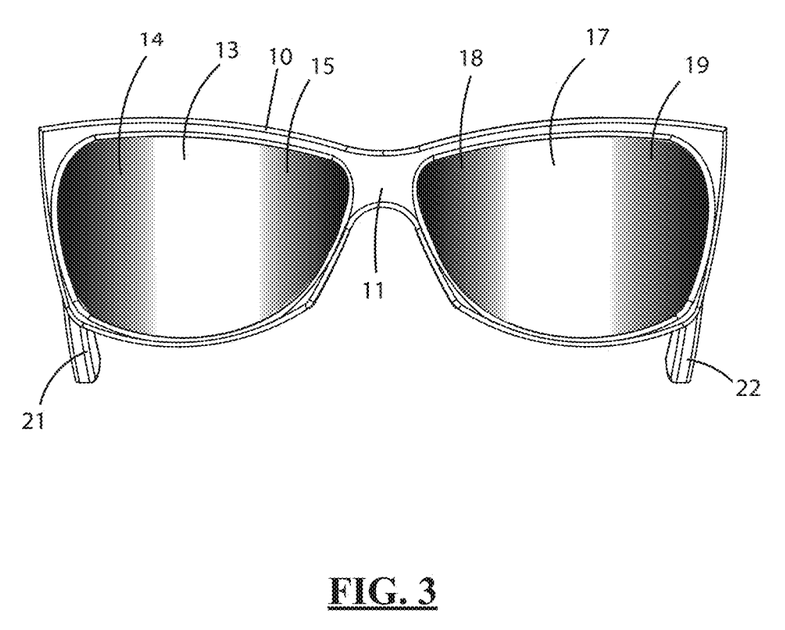
FIG. 3 is an exterior front view of the eyeglasses of the embodiment of FIG. 1.
Figure 4:
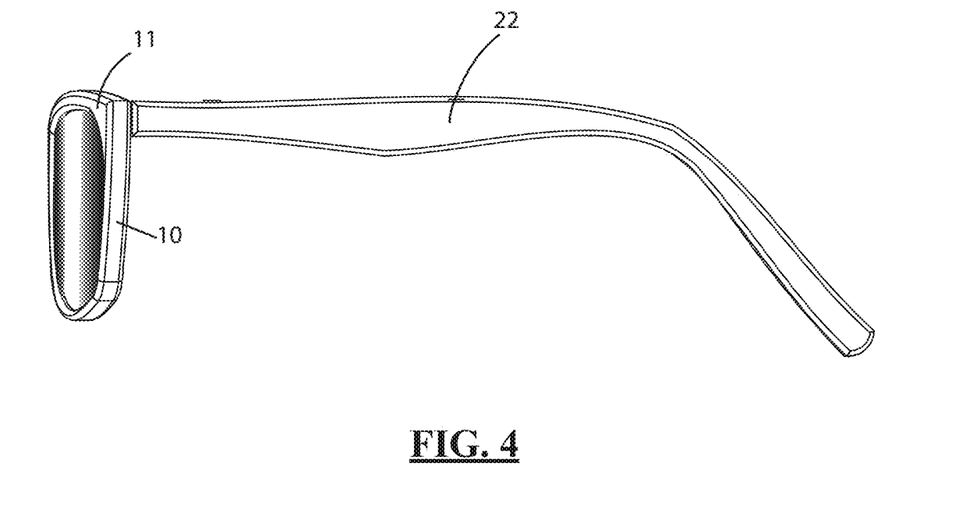
FIG. 4 is a left-side front view of the eyeglasses of the embodiment of FIG. 1.
Figure 5:
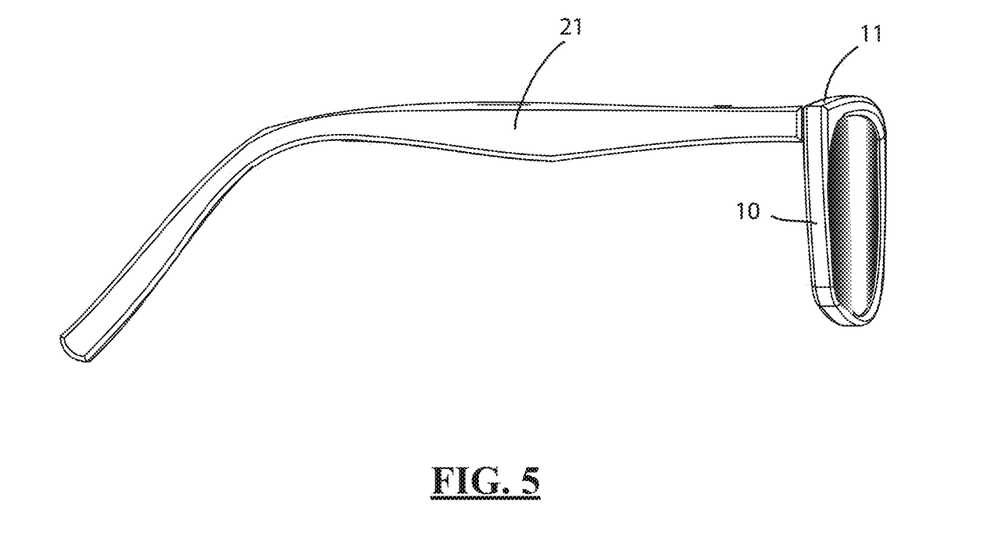
FIG. 5 is a right-side front view of the eyeglasses of the embodiment of FIG. 1.
Figure 6:
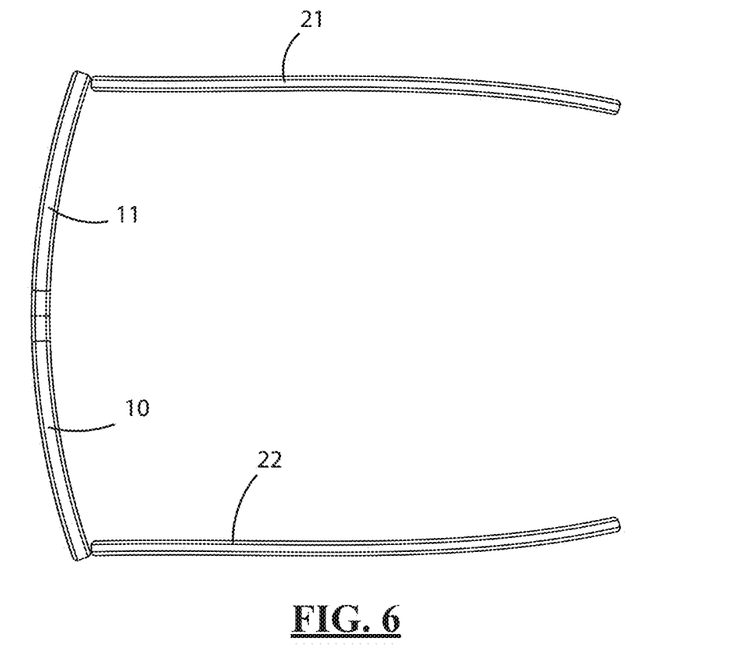
FIG. 6 is a top front view of the eyeglasses of the embodiment of FIG. 1.
Figure 7:
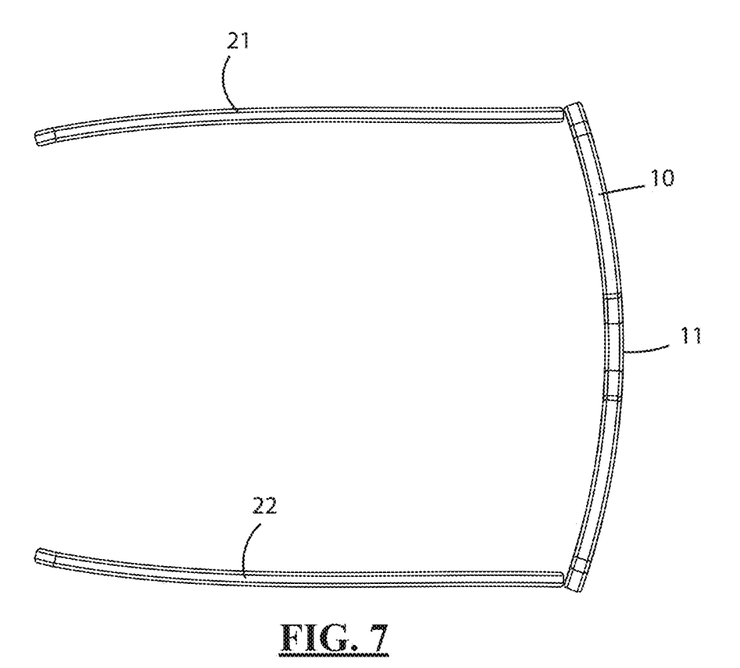
FIG. 7 is a bottom front view of the eyeglasses of the embodiment of FIG. 1.
Figure 8:
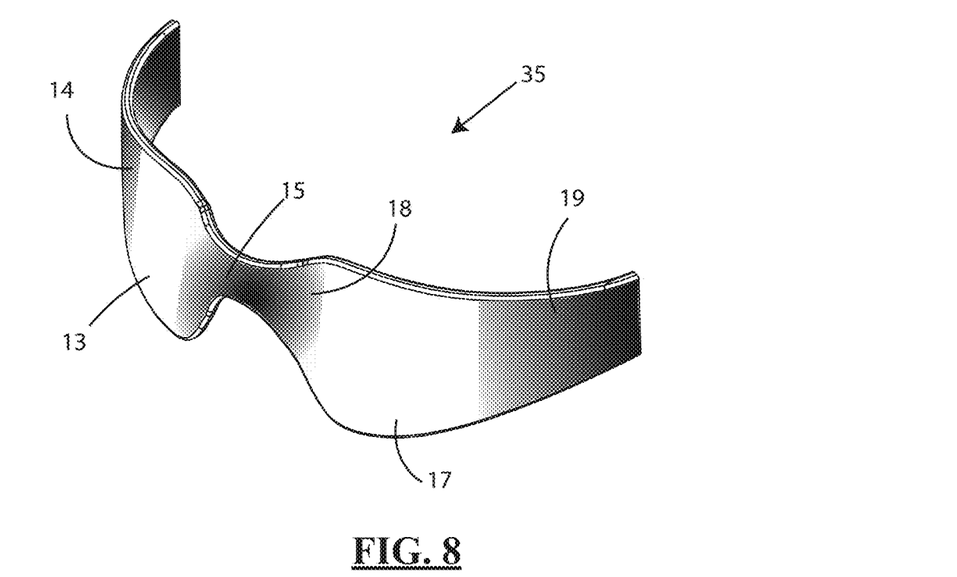
FIG. 8 is a top perspective view of the eyeglasses of another embodiment of the present invention.
Figure 9:
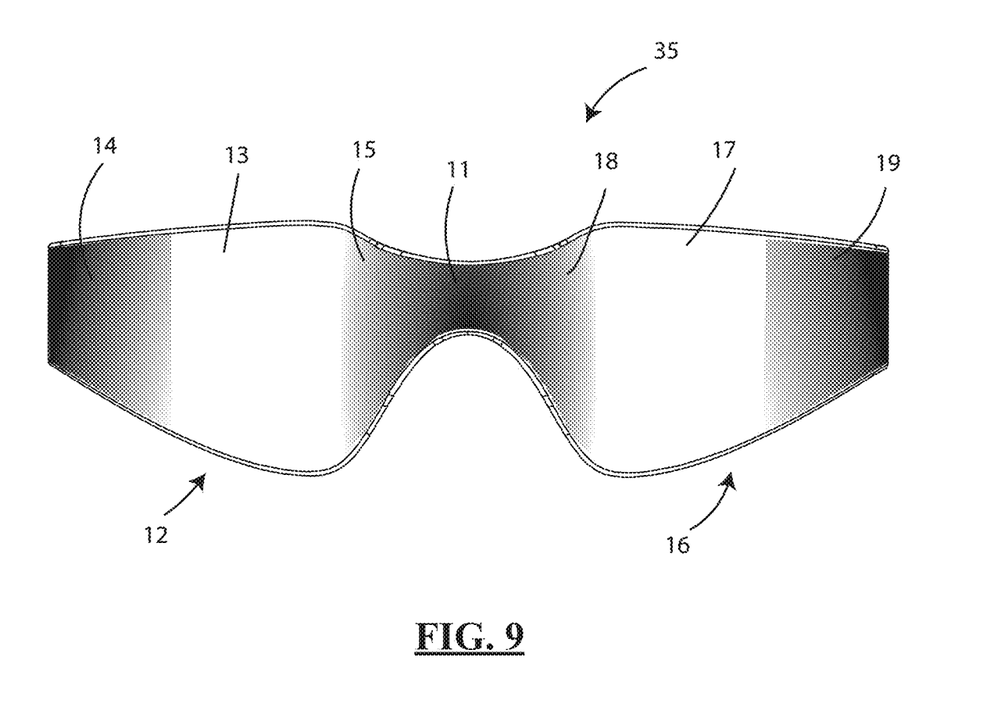
FIG. 9 is an exterior front view of the eyeglasses of the embodiment of FIG. 8.
Figure 10:
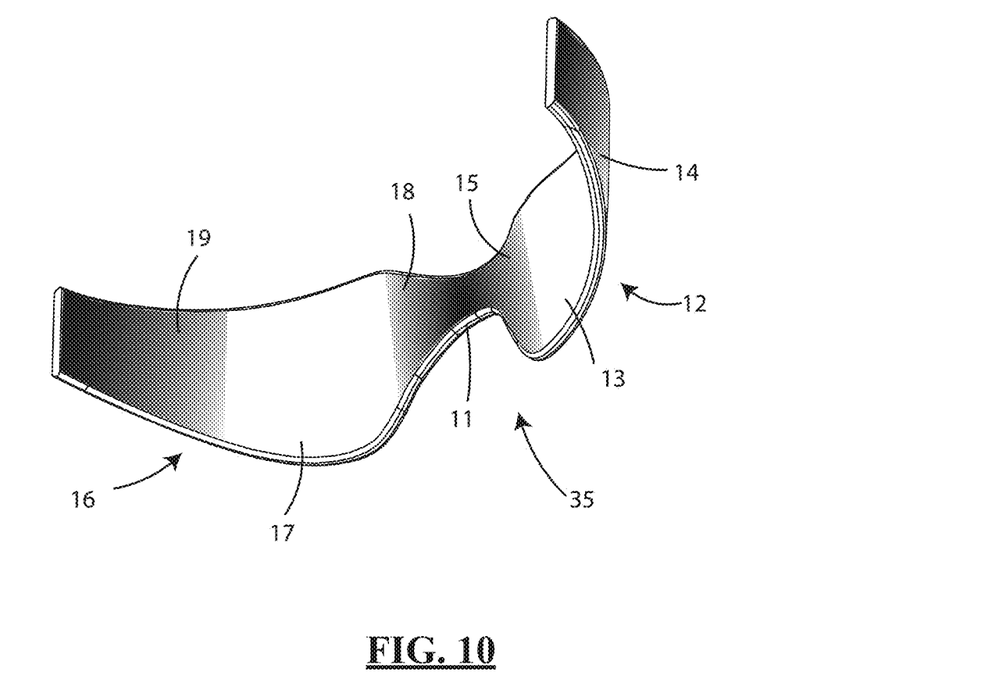
FIG. 10 is a lower interior perspective view of the eyeglasses of the embodiment of FIG. 8.
Figure 11:
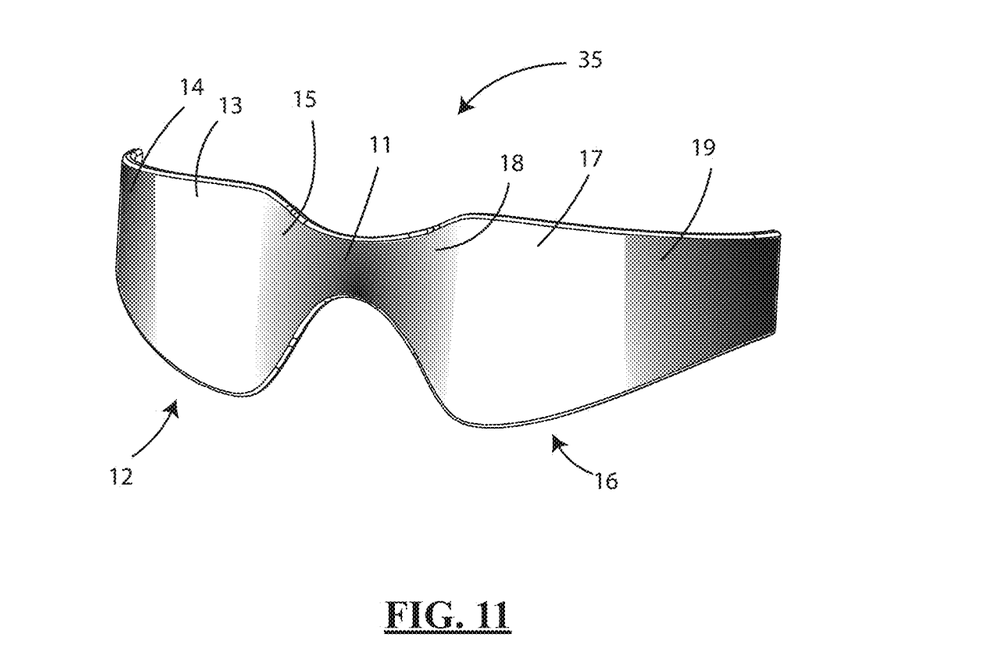
FIG. 11 is another perspective view of the eyeglasses of the embodiment of FIG. 8.
Figure 12:
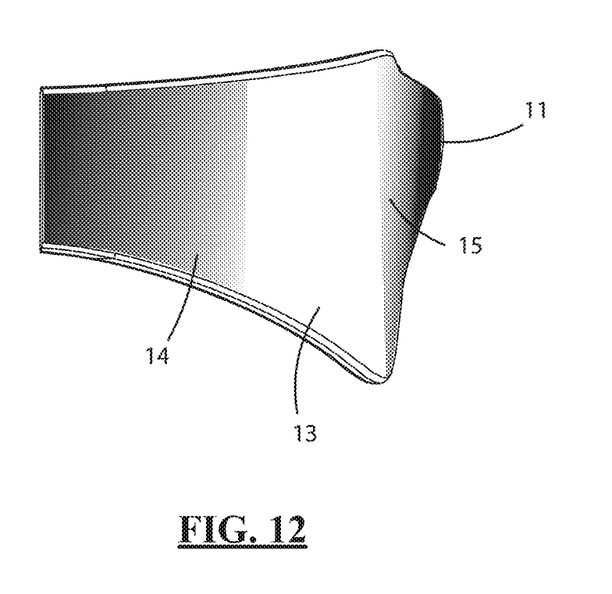
FIG. 12 is a right-side front view of the eyeglasses of the embodiment of FIG. 8.
Figure 13:
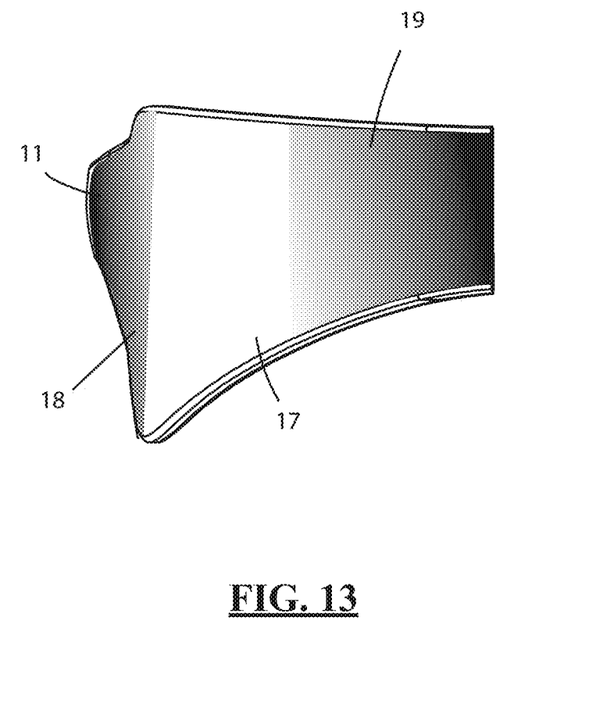
FIG. 13 is a left-side front view of the eyeglasses of the embodiment of FIG. 8.
Figure 14:
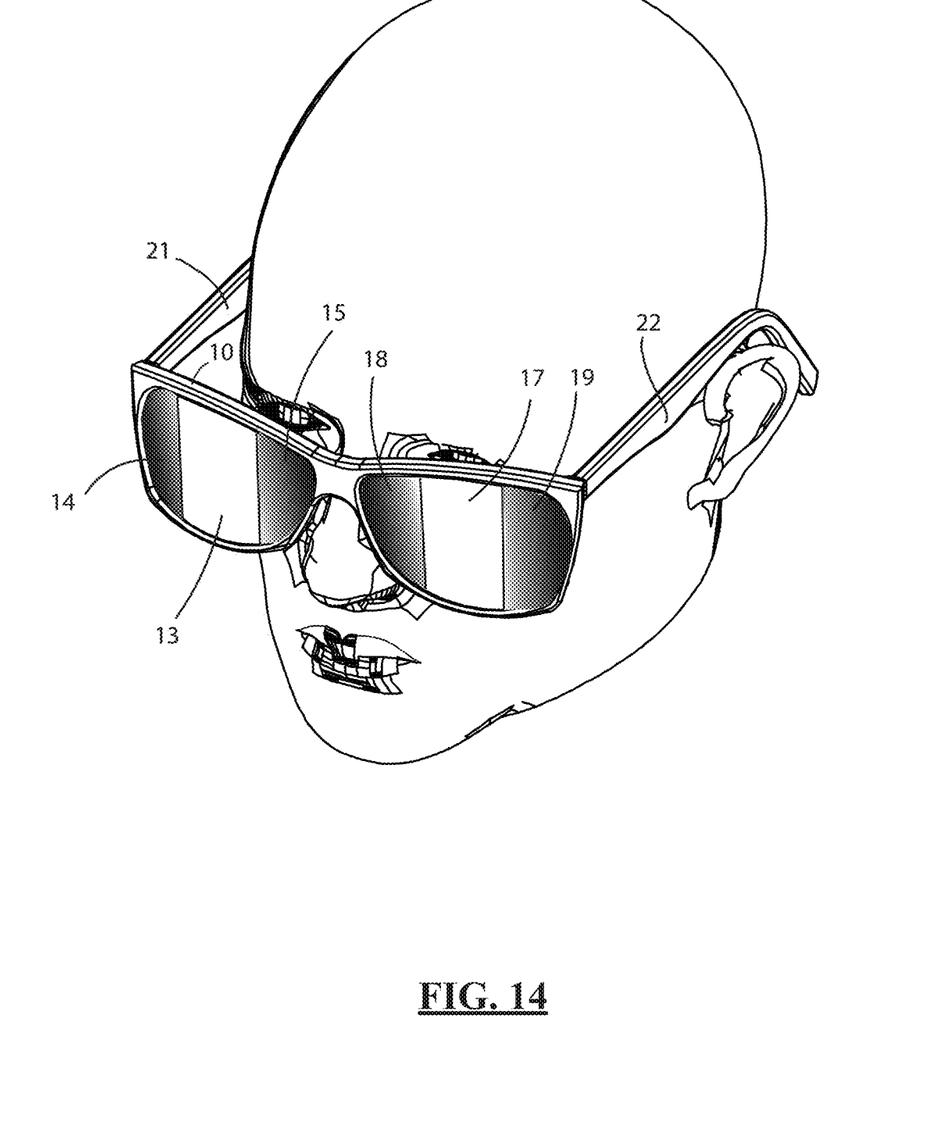
FIG. 14 is an environmental view showing eyeglasses of an embodiment of the present invention on the head of a wearer.

In use, a wearer selects and dons eyeglasses having a desired amount of left and right lens shading and a desired color (as shown in FIG. 14), or a wearer places strips of a desired size, shape, positioning, and color onto existing eyeglasses, or a wearer clips or places lenses over existing eyeglasses having left and right shaded areas having a desired size, shape, positioning, and color. While driving in the dark, if bright lights are encountered from oncoming traffic, the wearer turns their head slightly in one direction (e.g. to the right in the USA) to bring the shaded areas of the lenses between the oncoming light and the wearer's eyes. Similarly, if a vehicle behind the wearer is sending bright light to the side mirrors, the wearer may turn their head slightly in either direction to bring the shaded areas of the lenses between the light from the side mirror(s) and the wearer's eyes. Once the bright light is gone, the wearer may return their head to its original position.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein, and that the present invention encompasses many other combinations of the various features disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a left side of the left lens, the first shaded area extending from the unshaded central area of the left lens to a left edge of the left lens, wherein the first shaded area has a convex shape that protrudes into a middle of the central unshaded area of the left lens.

2. The eyeglasses of claim 1 further comprising a second shaded area extending from the unshaded central area of the left lens to a right edge of the left lens wherein the second shaded area has a convex shape that protrudes into a middle of the central unshaded area of the left lens.

3. The eyeglasses of claim 1 further comprising a third shaded area extending from the unshaded central area of the right lens to a right edge of the right lens wherein the third shaded area has a convex shape that protrudes into a middle of the central unshaded area of the right lens.

4. The eyeglasses of claim 1 further comprising a fourth shaded area extending from the unshaded central area of the right lens to a left edge of the right lens wherein the fourth shaded area has a convex shape that protrudes into a middle of the central unshaded area of the right lens.

5. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a shaded area is provided on a right side the right lens, the first second shaded area extending from the unshaded central area of the right lens to a right edge of the right lens wherein the first shaded area has a convex shape that protrudes into a middle of the central unshaded area of the right lens.

6. The eyeglasses of claim 5 further comprising a second shaded area extending from the unshaded central area of the right lens to a left edge of the right lens wherein the second shaded area has a convex shape that protrudes into a middle of the central unshaded area of the right lens.

7. The eyeglasses of claim 5 further comprising a third shaded area extending from the unshaded central area of the left lens to a right edge of the left lens wherein the third shaded area has a convex shape that protrudes into a middle of the central unshaded area of the left lens.

8. The eyeglasses of claim 5 further comprising a fourth shaded area extending from the unshaded central area of the left lens to a left edge of the left lens wherein the fourth shaded area has a convex shape that protrudes into a middle of the central unshaded area of the left lens.

9. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a left side of the left lens, the first shaded area extending from the unshaded central area of the left lens to a left edge of the left lens, wherein the first shaded area has a triangular shape that protrudes into a middle of the central unshaded area of the left lens.

10. The eyeglasses of claim 9 further comprising a second shaded area extending from the unshaded central area of the left lens to a right edge of the left lens wherein the second shaded area has a triangular shape that protrudes into a middle of the central unshaded area of the left lens.

11. The eyeglasses of claim 9 further comprising a third shaded area extending from the unshaded central area of the right lens to a right edge of the right lens wherein the third shaded area has a triangular shape that protrudes into a middle of the central unshaded area of the right lens.

12. The eyeglasses of claim 9 further comprising a fourth shaded area extending from the unshaded central area of the right lens to a left edge of the right lens wherein the fourth shaded area has a triangular shape that protrudes into a middle of the central unshaded area of the right lens.

13. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a right side the right lens, the first shaded area extending from the unshaded central area of the right lens to a right edge of the right lens wherein the first shaded area has a triangular shape that protrudes into a middle of the central unshaded area of the right lens.

14. The eyeglasses of claim 13 further comprising a second shaded area extending from the unshaded central area of the right lens to a left edge of the right lens wherein the second shaded area has a triangular shape that protrudes into a middle of the central unshaded area of the right lens.

15. The eyeglasses of claim 13 further comprising a third shaded area extending from the unshaded central area of the left lens to a right edge of the left lens wherein the third shaded area has a triangular shape that protrudes into a middle of the central unshaded area of the left lens.

16. The eyeglasses of claim 13 further comprising a fourth shaded area extending from the unshaded central area of the left lens to a left edge of the left lens wherein the fourth shaded area has a triangular shape that protrudes into a middle of the central unshaded area of the left lens.

17. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a left side of the right lens, the first shaded area extending from the unshaded central area of the right lens to a left edge of the right lens, wherein the first shaded area has a convex shape that protrudes into a middle of the central unshaded area of the right lens.

18. The eyeglasses of claim 17 further comprising a second shaded area extending from the unshaded central area of the right lens to a right edge of the right lens wherein the second shaded area has a convex shape that protrudes into a middle of the central unshaded area of the right lens.

19. The eyeglasses of claim 17 further comprising a third shaded area extending from the unshaded central area of the left lens to a right edge of the left lens wherein the third shaded area has a convex shape that protrudes into a middle of the central unshaded area of the left lens.

20. The eyeglasses of claim 17 further comprising a fourth shaded area extending from the unshaded central area of the left lens to a left edge of the left lens wherein the fourth shaded area has a convex shape that protrudes into a middle of the central unshaded area of the left lens.

21. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a right side the left lens, the first shaded area extending from the unshaded central area of the left lens to a right edge of the left lens wherein the first shaded area has a convex shape that protrudes into a middle of the central unshaded area of the left lens.

22. The eyeglasses of claim 21 further comprising a second shaded area extending from the unshaded central area of the left lens to a left edge of the left lens wherein the second shaded area has a convex shape that protrudes into a middle of the central unshaded area of the left lens.

23. The eyeglasses of claim 21 further comprising a third shaded area extending from the unshaded central area of the right lens to a right edge of the right lens wherein the third shaded area has a convex shape that protrudes into a middle of the central unshaded area of the right lens.

24. The eyeglasses of claim 21 further comprising a fourth shaded area extending from the unshaded central area of the right lens to a left edge of the right lens wherein the fourth shaded area has a convex shape that protrudes into a middle of the central unshaded area of the right lens.

25. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a left side of the right lens, the first shaded area extending from the unshaded central area of the right lens to a left edge of the right lens, wherein the first shaded area has a triangular shape that protrudes into a middle of the central unshaded area of the right lens.

26. The eyeglasses of claim 25 further comprising a second shaded area extending from the unshaded central area of the right lens to a right edge of the right lens wherein the second shaded area has a triangular shape that protrudes into a middle of the central unshaded area of the right lens.

27. The eyeglasses of claim 25 further comprising a third shaded area extending from the unshaded central area of the left lens to a right edge of the left lens wherein the third shaded area has a triangular shape that protrudes into a middle of the central unshaded area of the left lens.

28. The eyeglasses of claim 25 further comprising a fourth shaded area extending from the unshaded central area of the left lens to a left edge of the left lens wherein the fourth shaded area has a triangular shape that protrudes into a middle of the central unshaded area of the left lens.

29. Eyeglasses comprising a frame supporting a left lens in front of a user's left eye, and a right lens in front of a user's right eye, wherein each of said lenses comprises an unshaded central area in front of each eye that extends from a top edge of the lens to a bottom edge of the lens, wherein a first shaded area is provided on a right side the left lens, the first shaded area extending from the unshaded central area of the left lens to a right edge of the left lens wherein the first shaded area has a triangular shape that protrudes into a middle of the central unshaded area of the left lens.

30. The eyeglasses of claim 29 further comprising a second shaded area extending from the unshaded central area of the left lens to a left edge of the left lens wherein the second shaded area has a triangular shape that protrudes into a middle of the central unshaded area of the left lens.

31. The eyeglasses of claim 29 further comprising a third shaded area extending from the unshaded central area of the right lens to a right edge of the right lens wherein the third shaded area has a triangular shape that protrudes into a middle of the central unshaded area of the right lens.

32. The eyeglasses of claim 29 further comprising a fourth shaded area extending from the unshaded central area of the right lens to a left edge of the right lens wherein the fourth shaded area has a triangular shape that protrudes into a middle of the central unshaded area of the right lens.

* * * * *